(12) United States Patent
Drew et al.

(10) Patent No.: US 7,984,893 B2
(45) Date of Patent: Jul. 26, 2011

(54) REUSABLE SUPPORT FOR A CONTOURED SURFACE OF A PART ALLOWING MACHINING OF AN OPPOSITE SIDE OF THE PART

(75) Inventors: Elmer Drew, Grosse Point Woods, MI (US); Dale Drew, Grosse Point Farms, MI (US); Jason Benolt, New Baltimore, MI (US); Rick Dries, St. Clair Shores, MI (US); Gary Bisson, Sterling Heights, MI (US); Michael Carollo, Shelby Township, MI (US)

(73) Assignee: RCO Engineering, Roseville, MI (US)

( * ) Notice: Subject to any disclaimer, the term of this patent is extended or adjusted under 35 U.S.C. 154(b) by 1344 days.

(21) Appl. No.: 11/352,851

(22) Filed: Feb. 13, 2006

(65) Prior Publication Data

US 2007/0186404 A1    Aug. 16, 2007

(51) Int. Cl.
*B29C 37/02* (2006.01)
*B29C 33/40* (2006.01)
(52) U.S. Cl. ........................................ 254/226; 264/138
(58) Field of Classification Search .................. 264/138, 264/226
See application file for complete search history.

(56) References Cited

U.S. PATENT DOCUMENTS

| | | | |
|---|---|---|---|
| 3,435,946 A * | 4/1969 | Sobek et al. | 206/523 |
| 3,982,845 A | 9/1976 | Dockery et al. | |
| 4,559,094 A | 12/1985 | Hostetler et al. | |
| 4,621,956 A | 11/1986 | Hartman et al. | |
| 4,684,113 A * | 8/1987 | Douglas et al. | 269/21 |
| 4,890,235 A | 12/1989 | Reger et al. | |
| 4,972,351 A | 11/1990 | Reger et al. | |
| 5,415,504 A | 5/1995 | Wolf et al. | |
| 5,774,969 A | 7/1998 | Zuccato | |
| 5,776,510 A | 7/1998 | Reichental et al. | |
| 5,826,946 A | 10/1998 | Matthews et al. | |
| 6,021,358 A | 2/2000 | Sachs | |
| 6,324,750 B1 | 12/2001 | Saunders et al. | |
| 6,386,850 B1 | 5/2002 | Salerno et al. | |
| 6,588,086 B2 | 7/2003 | Trybus | |
| 6,880,215 B2 | 4/2005 | Peterson | |
| 6,890,462 B2 | 5/2005 | Panczyk et al. | |
| 6,941,188 B1 | 9/2005 | Arnold, II | |

* cited by examiner

*Primary Examiner* — Christina Johnson
*Assistant Examiner* — Patrick Butler
(74) *Attorney, Agent, or Firm* — Young & Basile, P.C.

(57) ABSTRACT

A process can include the step of forming a removable support having a complementary contour to a machined surface of a block of material to be processed in order to support the machined surface from an opposite planar surface formed on the removable support during machining of the opposite side of the block of material. The process can include the steps of processing a block of material on a machine to form one surface; inserting a support having a complementary contour to support the one surface and an opposite planar surface; rotating the block of material onto the opposite planar surface of the support to machine the opposite side of the block of material; releasing the support along a parting line defined by the complementary contour; and reusing the support for the next block of material having the same contour configuration.

18 Claims, 3 Drawing Sheets

REUSABLE SUPPORT FOR A CONTOURED SURFACE OF A PART ALLOWING MACHINING OF AN OPPOSITE SIDE OF THE PART

FIELD OF THE INVENTION

The present invention relates to a method of manufacturing prototype polyurethane automotive interior parts using a computer numeric controlled (CNC) machine to form part contours from a block of high density polyurethane foam and using an expandable material to form a support for the first machined surface while machining the opposite side surface, where the polyurethane foam support is reusable for multiple prototype parts of the same configuration.

BACKGROUND

A method of machining plastic soft foam blocks is disclosed in U.S. Pat. No. 6,588,086. This patent discloses a method including the steps of routing a contour recessed into one side of a plastic soft foam block, filling a cavity formed during the routing step with a granular material, preferably using the material generated by the routing process, retaining the material with a covering as the block is inverted, and routing a second contour into the opposite side of the block. While this method can be used satisfactorily for some applications, it requires filling and emptying of granular material from the cavity of each block during processing, which can be a time consuming operation and can result in a messy workstation environment. It would be desirable in the present invention to provide a solid single piece support that could be inserted and removed with minimal time and with no mess to the surrounding work area. In addition, the granular material filling the cavity of each block may not provide a solid and stable support for the block during the latter routing sequence. It would be desirable in the present invention to provide a solid and stable support surface for the block while machining the opposite side.

A method of shaping a foam article is disclosed in U.S. Pat. No. 6,941,188. This patent discloses a method including the steps of cutting a block of foam using a programmable milling machine to remove one or more portions of a first side of the foam block to the contour of the desired first surface, leaving at least one supporting portion on the first side of the foam block, removing a second side of the foam block opposite from the first side to the contour of the desired second surface, and cutting the first side of the foam block to remove the supporting portion at the level of the desired surface. While this process may be suitable for some applications, it requires additional cutting steps to remove the supporting portion on the first side of the foam block. It would be desirable in the present invention to provide a support surface that did not require additional cutting steps for removal from the foam block. In addition, the cutting process can imply a relatively planar surface on one side of the foam block for removal of the supporting portion. It would be desirable in the present invention to provide a support surface that is not limited to a planar surface configuration for the finished contour of the foam block being processed.

SUMMARY

The present invention includes a method of manufacturing prototype polyurethane automotive interior parts using a computer numeric controlled (CNC) machine to form part contours from a block of high density polyurethane foam and using polyurethane foam to support the first machined side surface, sometimes referred to as a side "A" surface, while machining the opposite side surface, sometimes referred to as a side "B" surface, where the polyurethane foam support is reusable for multiple prototype parts of the same configuration. The process can include the step of providing a computer aided design (CAD) file drawing of the part to be processed. The process can include the steps of processing a block of polyurethane foam on a CNC machine to cut one surface (side A or side B); placing a plastic sheet over the finished surface; applying poured expandable foam material over the plastic sheet; cutting the cured foam material applied over the plastic sheet with a wire saw back to a level surface; rotating the block of foam to machine the opposite side (side B or side A); removing the part from the CNC machine; releasing the foam insert along the plastic sheet parting line; and reusing the foam insert for the next part of the same configuration.

The process according to the present invention can include the steps of processing a block of material on a machine to form one surface (side A or side B); inserting a support having a complementary contour to support the one surface and an opposite planar surface; rotating the block of material onto the opposite planar surface of the support to machine the opposite side (side B or side A) of the block of material; releasing the support along a parting line defined by the complementary contour; and reusing the support for the next block of material having the same contour configuration.

The process according to the present invention can include the step of forming a removable support having a complementary contour to a machined surface of a block of material to be processed in order to support the machined surface from an opposite planar surface formed on the removable support.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

It should be recognized that various shaped contours for articles can be made from various blocks of material. The present invention is particularly well adapted for use in processing foam polymeric materials. By way of example and not limitation, a suitable polymeric material is foam polyurethane. Polyurethane foam can be provided in a range of densities and compositions with varying degrees of elasticity. When a processing operation is performed to shape opposite sides of a foam article, any increased flexibility can cause distortion of the article being formed due to insufficient support when the second side of the foam body is being shaped. By way of example and not limitation, foam articles according to the present invention can include vehicle interior components, such as prototype parts, vehicle seats, furniture cushions, toys, and other padded articles. Foam seating surfaces for vehicles can be produced in a production setting using a two-component polyurethane reactant mixture to be poured into a specially designed mold that forms the seat body in situ to the desired size and shape. Prototype foam seating surfaces require different manufacturing processes than that available in the high capacity production environment. It is not unusual for a manufacturer to require different prototype designs to be produced for evaluation prior to deciding on a final production design. A high capacity production mold can be manufactured based on the approved prototype design.

Blocks of pre-formed foam can be cut with a knife or formed with a programmable milling machine to produce prototypes for evaluation purposes. However, it is difficult to accurately cut a block of flexible foam due to the tendency of foam material to distort as pressure is applied to the block of material. This problem is exaggerated when one side of the foam block has previously been processed to a desired contour and then an opposite side of the block needs to be shaped while the previously shaped side is used for supporting the block of material.

The present invention provides a quick and accurate process for shaping a block of material requiring contoured surfaces to be formed on opposite sides of the article to be processed. The present invention provides a process capable of using computer aided design data as a starting point for optimizing control of a computer numeric controlled machine to form an article shaped on opposite sides to desired design tolerances from a block of material, such as foam polyurethane or high density polyurethane foam.

Figure 1:
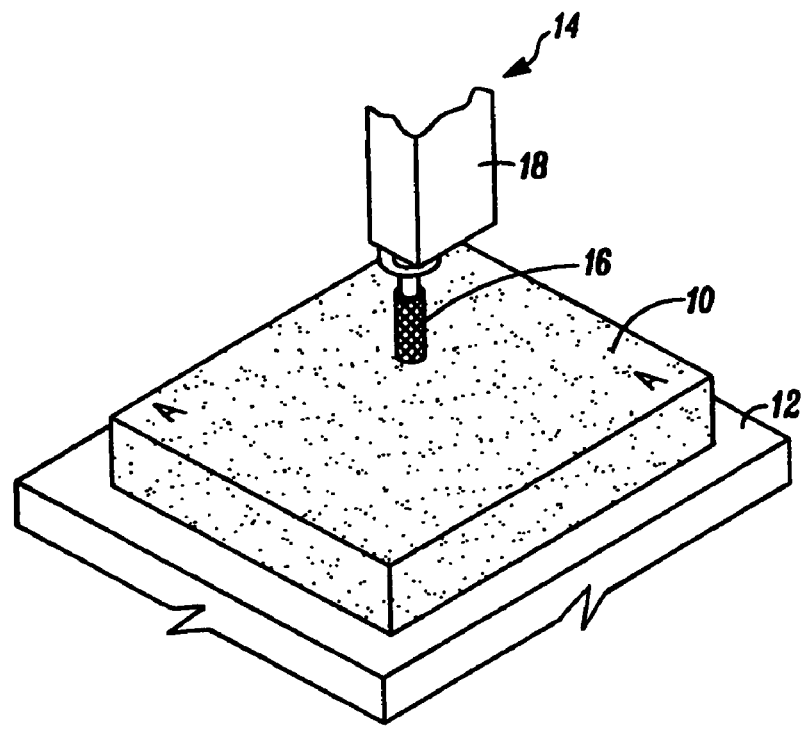
FIG. 1 is a perspective view of a numeric controlled (CNC) machine preparing to cut or mill a block of material, such as foam, in accordance with the present invention.

Referring now to FIG. 1, a block 10 of material, such as foam polymeric material or foam polyurethane, is supported in any suitable manner in a predetermined position and orientation on supporting surface 12 of a computer numeric controlled machine 14. Computer numeric controlled machines are commercially available for use in machining plastics, wood, aluminum, or brass. A tool 16 can be positioned by a carrier 18 for movement relative to the block of material while the tool 16 is rotated. It should be recognized that the tool 16 could be rotated in a stationary orientation while the block of material is moved relative to the tool without departing from the present invention. The rotary tool 16 is mounted and relative movement between the support surface 12 and tool 16 is controlled by the programmable computer numeric controlled machine to cause the tool 16 to form a desired contoured surface in the block 10 of material.

Figure 2:
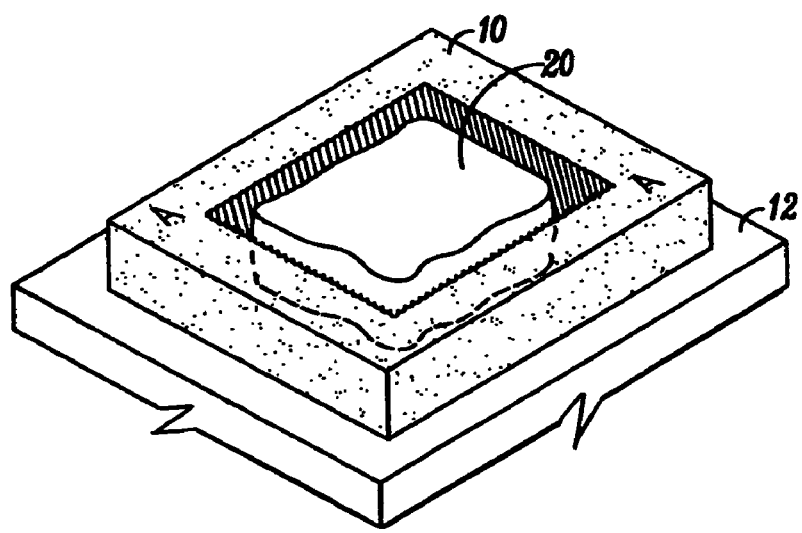
FIG. 2 is a perspective view of the block of material after a first side of an article has been processed according to computer aided design (CAD) data used to program the CNC machine.
Figure 3:
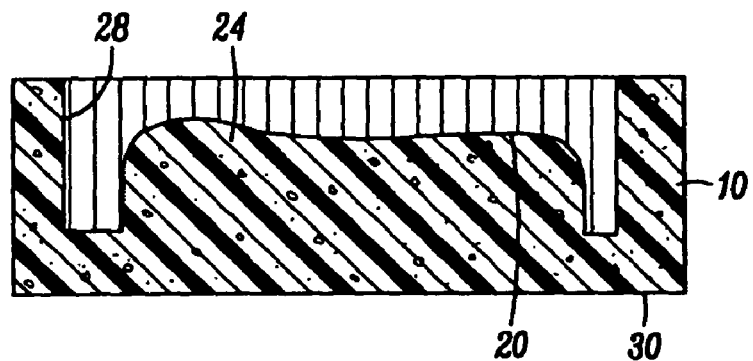
FIG. 3 is a cross sectional view of the partially formed article illustrated in FIG. 2.
Figure 4:
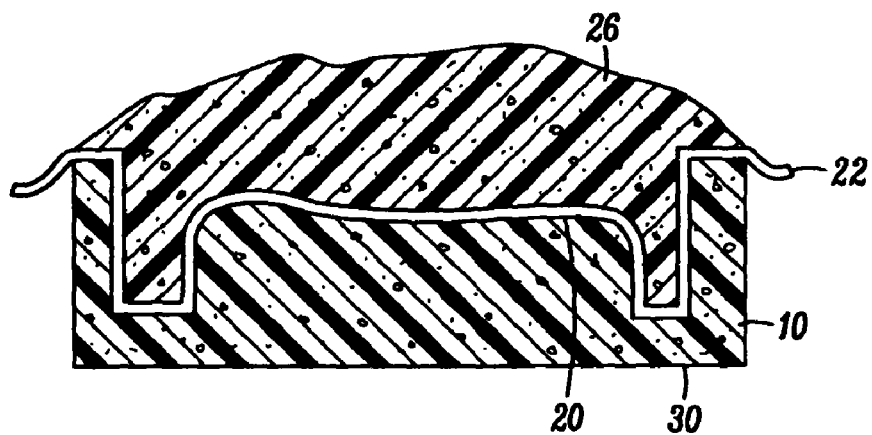
FIG. 4 is a cross sectional view of the partially formed article illustrated in FIG. 3 with a release surface layer covering the finished contour surface of the article and an expandable material applied to the opposite side of the release layer from the formed article to expand above a predetermined position, such as a top surface of the original block of material.
Figure 5:
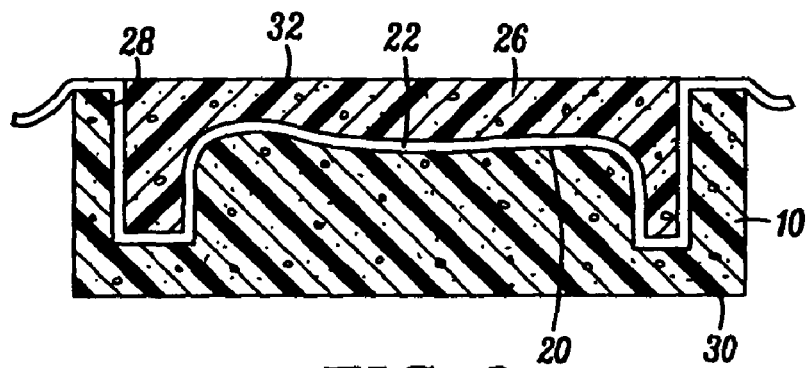
FIG. 5 is a cross sectional view of the partially formed article in the block of material with the expanded material on the opposite side of the release layer cut to form a planar surface at a predetermined or desired location spaced from the bottom surface of the original block of material.

Referring now to FIG. 2, a first surface contour of an article 20 to be processed has been formed in the block 10 of material by the tool 16. A cross section of the block 10 of material at this stage of processing is illustrated in FIG. 3. A release layer 22 of material is placed over the first surface contour 20 of the article 24 being formed. The release layer 22 of material forms a barrier between the contoured surface 20 of the article 24 being formed and a poured expandable material used to form the removable support 26. Initially, the poured expandable material can form an irregular surface as the material expands in the cavity 28 formed by the tool 16 to define the first surface contour 20 in the block 10 of material while shaping the article 24. FIG. 4 illustrates the poured expandable material forming the removable support 26 in an expanded condition extending from the cavity 28. After the expandable material sets or cures, the excess material can be removed to form a flat planar surface on the first side of the block 10 of material that has been processed. It should be noted that the release layer 22 is shown with an exaggerated thickness dimension for purposes of the illustration only.

Figure 6:
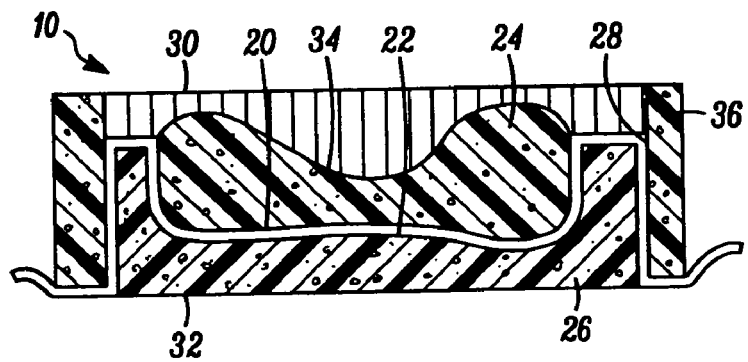
FIG. 6 is a cross sectional view of the block of material illustrated in FIG. 5 inverted to present the opposite face of the block of material for processing and after having a processing operation performed on the opposite face to form a second contoured portion of the article being produced.
Figure 7:
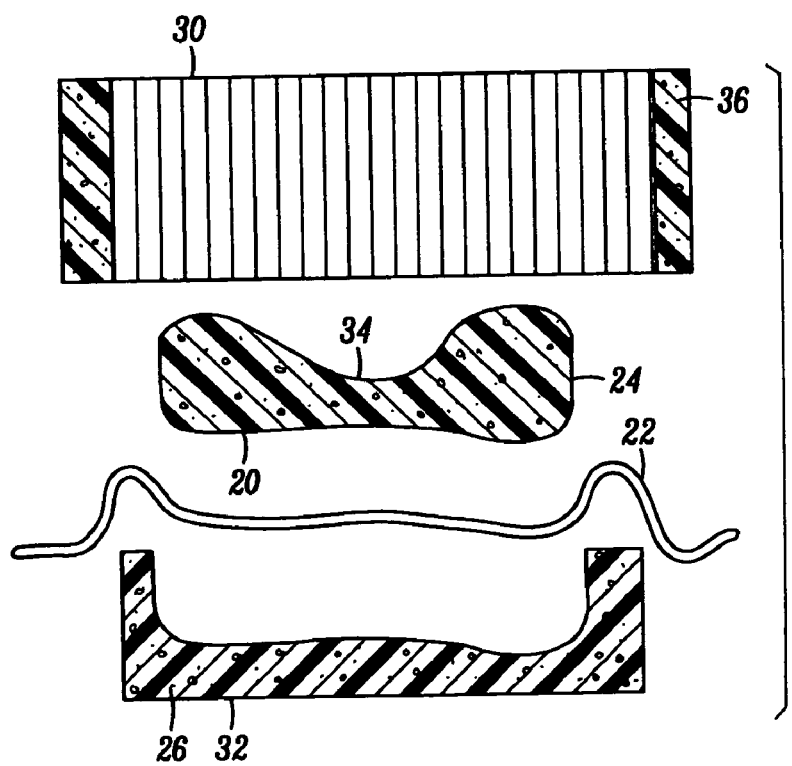
FIG. 7 is an exploded cross sectional view of the block illustrated in FIG. 6 showing a waste portion of the original block of material, a finished article, a release layer; and a removable support.

Referring now to FIG. 6, the block 10 of material can be inverted in order to present the opposite face 30 of the block 10 of material for processing while being supported on the planar surface 32 of the removable support 26. FIG. 6 illustrates a cross sectional view of the block 10 of material after the tool 16 has formed a second surface contour 34 of the article 24 to be produced. The combination of the tool 16 forming the first and second contours 20, 34 allows release of the produced article 24 from the block 10 of material as best seen in FIG. 7. FIG. 7 illustrates an exploded view including a waste portion 36 of the block 10 of material, a finished article contour 24, release layer 22 and removable support 26 as separate independent pieces with respect to one another.

Figure 8:
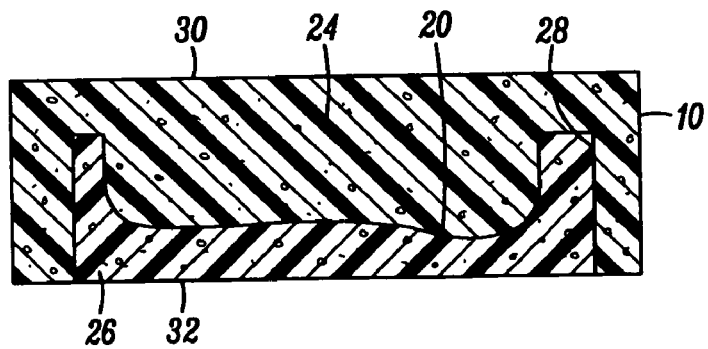
FIG. 8 is a cross sectional view of the removable support used in another block of material being processed to form the same article as illustrated in FIG. 7 without requiring the use of a release layer when the removable support is reused for identical articles during later processing.

It should be recognized that materials could be selected in order to more permanently associate the release layer with the removable support 26, if desired. It should also be recognized as illustrated in FIG. 8, that the removable support 26 can be used for supporting subsequent surface contours 20 of articles 24 to be produced from blocks 10 of the material when producing more than one article of the same identical configuration. The process according to the present invention reduces cost and increases prototype production productivity.

A process according to the present invention supports a contoured surface of a block of material while machining an opposite surface of the block of material. According to the present invention, a removable support is formed having a complementary contour to a contoured surface of a block of material to be processed in order to support the contoured surface from an opposite planar surface formed on the removable support. The block of material can include a high density polyurethane foam material to be processed into an article of any desired contour. The removable support can be released along a parting line defined by the complementary contour of the block of material being processed. The removable support can be reused for another block of material having the same contoured configuration to be supported for subsequent processing. The process according to the present invention can include the step of processing a block of material on a machine to form one surface, and inserting the removable support having a complementary contour to support the one surface from an opposite planar surface formed on the removable support. The block of material can then be rotated onto the opposite planar surface formed on the support to machine the opposite side of block of material being processed.

The removable support can be formed according to the process of the present invention by applying a release layer or film to the contoured surface of the block of material being processed. A poured expandable material can then be applied to a side of the release layer or film opposite from the contoured surface of the block of material to define the removable support. The expandable foam material defining the removable support can be allowed to expand from the side of the release layer or film opposite from the block of material being processed. The expanded foam material defining the removable support can then be cut to form a flat planar surface at a distance spaced from the side of the releasable film opposite from the block of material being processed. The expanded foam material defining the removable support can then be released along a parting line defined by the release layer covering the complementary contour of the block material being processed.

The process according to the present invention can also include manufacturing prototype polyurethane automotive interior parts using a computer numeric controlled machine to form part contours from a block of high density polyurethane foam while using a removable high density polyurethane foam support for supporting the first machine surface while machining the opposite surface of the block of high density polyurethane foam. A block of high density polyurethane foam can be processed on a computer numeric controlled machine to cut one surface contour. A release layer of material can be placed over the finished contoured surface. An expandable high density polyurethane foam can be applied over the release layer and can be allowed to cure. The cured expanded high density polyurethane foam can be cut with a wire saw to a level planar surface spaced from the first contoured surface of the article to be produced. The block of high density polyurethane foam material can then be rotated in order to be supported from the level planar surface of the cured expandable high density polyurethane foam in order to present the opposite surface of the block of high density polyurethane foam for processing. The opposite surface of the block of high density polyurethane foam can then be processed to form a second finished contoured surface. The machined block of high density polyurethane foam can then be removed from the computer numeric controlled machine. The cured expandable high density polyurethane foam can define a removable support that can be released from a position supporting the first finished surface of the block along a parting line defined by the release layer. The removed cured expandable high density polyurethane foam support can be reused as a removable support to be inserted in the cavity defined by another block of high density polyurethane foam material to be machined with an identical configuration.

The release layer or film by way of example and not limitation can include saran wrap, aluminum foil, wax paper, vinyl sheeting, a fabric material, or any combination thereof. The selection criteria for the release layer is based on the need to form a barrier between the solid contoured surface of the partially formed article in the original block of material and the poured expandable material used to form the removable support; the thickness of the article being processed and the thickness of the removable support being formed; the malleability of the original block of material and the malleability of the expandable material forming the removable support; the ability of the release layer material to be able to hold back a liquid expandable material; and/or any combination of the criteria. The primary consideration for the release layer material being selected is the ability to conform to the contoured surface or cavity formed in the original block of material when the article is partially formed in order to achieve a proper one to one fit or complementary parting line surfaces between the removable support and the article being formed. A release layer formed from a liquid barrier material applied to the contoured surface of the article being formed can be used if desired, provided that the liquid material does not seep into the surface of the original block of material in a deleterious manner and provided that the liquid barrier material does provide a interface layer capable of releasing the material forming the removable support.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for supporting a non-planar contoured surface of a block of polymeric foam material while machining an opposite surface of the block of polymeric foam material, the block having a first face and the opposed second face, the method comprising the steps of:

forming a one-piece, substantially solid removable support having a contour that is complementary to a non-planar contoured surface of a block of polymeric foam material to be processed, the one-piece substantially solid removable support configured to support the non-planar contoured surface from an opposite planar surface formed on the removable support, wherein the forming step includes the steps of:

a) processing the first face of the block of polymeric foam material by a machine to form a cavity, the cavity having an outer aperture and a region with at least the non-planar contoured surface, the second face of the block of polymeric foam material supported on a surface of the machine;

b) introducing an expandable foam material into the cavity formed in the first face of the block of polymeric foam material and allowing the introduced expandable foam material to cure to produce a support, the support having a non-planar contoured surface proximate to the non-planar contoured surface in the formed cavity and a planar support surface, the planar support surface opposed to the non-planar contoured surface located in the cavity of the block of polymeric foam material, wherein curing of the expandable material proceeds with the outer aperture into the cavity open;

c) rotating the block of polymeric foam material with the cured expandable foam in the cavity to a second position, wherein the planar support surface defined by the cured expandable foam contacts the support surface on the machine and the opposed second face of the block of polymeric foam is presented for processing by the machine;

d) while the block of polymeric foam is in the rotated position, processing the second opposed face of the block of polymeric foam material to form a second contoured surface; and e) removing the cured expandable foam material from contact with the cavity, the removed cured expandable foam material forming a removable support having a contour complementary to the first contoured surface formed in the block of polymeric foam material.

2. The process of claim 1 wherein the block of polymeric foam material is a high density polyurethane.

3. The process of claim 1 further comprising the step of:
after formation of the cavity in the first face of the block of polymeric foam material, positioning a release agent in contact with the surface of the cavity formed in the first face of the block of polymeric foam material; and
after the expandable foamed material has cured and formed a support and the second contoured surface of the second face of the polymeric foam material block has been formed, releasing the support along a parting line defined by the complementary contour of the block of polymeric foam material.

4. The process of claim 1 further comprising the step of:
reusing the support for machining the next block of polymeric foam material having the same contour configuration.

5. The process of claim 1 further comprising the step of:
processing a second block of polymeric foam material on the machine, the second block of polymeric foam material having a first face and a second opposed face, the first face processed to form a cavity having a region with at least one first contoured surface, the second opposed face of the block of polymeric foam material supported on a surface of the machine.

6. The process of claim 5 further comprising the step of:
inserting the removable support having the complementary contour into the cavity formed in the second block of polymeric foam material to support the first contoured surface and provide the opposed second surface.

7. The process of claim 6 further comprising the step of:
rotating the second block of polymeric foam material with the cured expandable foam support inserted in the cavity to a second position, wherein the planar support surface of the cured expandable foam support contacts the support surface on the machine and the opposed second face of the block of polymeric foam material is presented for processing by the machine.

8. The process of claim 1 further comprising the step of:
applying a releasible film to the surface of the cavity having the contoured surface of the block of polymeric foam material, prior to introducing the expandable foam material, the releasable film releasable from both the contoured surface and the introduced expandable foam material.

9. The process of claim 8 further comprising the step of:
applying an expandable material to a side of the releasible film opposed to the block of polymeric foam material to define the removable support.

10. The process of claim 9 further comprising the step of:
allowing the expandable foam material defining the removable support to expand from the side of the releasible film opposite from the block of polymeric foam material to a location beyond the plane coplanar with the first surface of the block of polymeric foam material.

11. The process of claim 10 further comprising the step of:
cutting the expandable foam material of the removable support to define a flat planar surface at a distance spaced from the side of the releasible film opposite from the block of polymeric foam material.

12. The process of claim 11 further comprising the step of:
releasing the removable support along a parting line defined by the release layer covering the complementary contour of the block of polymeric foam material.

13. A process for supporting a series of blocks of polymeric foam material each having at least one non-planar contoured surface while machining an opposite surface of each block of polymeric foam material, the process comprising the steps of:
processing a block of polymeric foam material on a machine to form a cavity having the at least one non-planar contoured surface therein;
inserting a support having into the formed cavity, the support having a contour complementary to the non-planar surface in the cavity to support the at least one non-planar contoured surface, the support having a planar surface opposed to the complementary contour, the support made of an expandable polymeric foam material,
wherein the support is formed by a process comprising the steps of:
a. introducing an expendible foam material the cavity formed in the block of polymeric foam material;
b. permitting the introduced foam material to cure in the cavity formed in the block of polymeric material to form the support; and
rotating the block of material onto the opposed planar surface of the support and machining the opposite side of the block of material;
releasing the support along a parting line defined by the complementary contour;
removing the support composed of cured expandible foam material from the suitable configured cavity; and
reusing the support for the next block of polymeric foam material having the same contour configuration.

14. The process of claim 13 wherein the support formation process further comprising the step of:
applying a releasible film to the contoured surface defined in the suitably configured cavity of the block of polymeric foam material, the releasable film configured to release from both the contoured surface of the block of polymeric foam material and the expandible polymeric material.

15. The process of claim 14 further comprising the step of:
applying an expandable polymeric foam material to a side of the releasable film opposite from the block of material to define the support and allowing the expandable polymeric foam material defining the support to expand from the side of the releasable film opposite from the block of material to a position out side the cavity defined in the block of polymeric foam material, the releasable film configured to release from both the contoured surface of the block of polymeric material and from the introduced expandable foam.

16. The process of claim 15 further comprising the step of:
cutting the cured expandable foam material of the support to a flat planar surface at a distance spaced from the side of the releasible film opposite from the block of material.

17. The process of claim 16 further comprising the step of:
releasing the cured expandable foam material support along a parting line defined by the releasable material covering the complementary contour of the block of polymeric foam material; and further
releasing the block of polymeric foam material from the releasable material.

18. A process for manufacturing prototype polyurethane automotive interior parts using a computer numeric controlled (CNC) machine to form part contours from a block of high density polyurethane foam while using a removable polyurethane foam support for supporting a first contoured surface, while machining an opposite contoured surface of the block of high density polyurethane foam, the process comprising the steps of:

- processing a block of high density polyurethane foam material on a CNC machine to cut a first contoured surface in a first face of the block of high density polyurethane material, the first contoured surface communicating with an opening defined in the block of high density polyurethane foam material;
- placing a release layer of material over the contoured surface defined in the first face of the block of high density polyurethane material;
- applying expandable foam material over the release layer of material;
- allowing the expandable foam material to cure and expand beyond the opening defined in the block of high density polyurethane foam material;
- cutting at least a portion of the cured expandable foam material applied over the release layer of material that has expanded beyond the opening defined in the block of high density polyurethane foam material to form a level planar surface opposed to the contoured surface defined in the block of high density foam material;
- rotating the block of high density polyurethane foam material to be supported on the level planar surface defined in the cured expandable foam material in order to support the block of high density polyurethane foam material with the opposite face presented for processing by the CNC machine;
- processing the opposite face of the block of high density polyurethane foam material on the CNC machine to cut a second contoured surface opposite from the first contoured surface;
- removing the machined block of high density polyurethane foam material from the CNC machine with the cured expandable foam material in position therein;
- releasing the cured expandable foam material supporting the first contoured surface of the block along a parting line defined by the release layer of material; and
- reusing the removed cured expandable foam material as an insertable support for another block of high density polyurethane foam material to be machined with an identical configuration.

* * * * *